United States Patent
Dabosville

(10) Patent No.: US 9,218,498 B2
(45) Date of Patent: Dec. 22, 2015

(54) METHOD OF VERIFYING THE VALIDITY OF AN ELECTRONIC PARKING TICKET

(75) Inventor: Guillaume Dabosville, Cormeilles en Parisis (FR)

(73) Assignee: OBERTHUR TECHNOLOGIES, Levallois-Perret (FR)

(*) Notice: Subject to any disclaimer, the term of this patent is extended or adjusted under 35 U.S.C. 154(b) by 263 days.

(21) Appl. No.: 12/886,326

(22) Filed: Sep. 20, 2010

(65) Prior Publication Data

US 2011/0068165 A1    Mar. 24, 2011

(30) Foreign Application Priority Data

Sep. 18, 2009   (FR) ...................................... 09 56433

(51) Int. Cl.
| | |
|---|---|
| G06K 17/00 | (2006.01) |
| G06F 21/62 | (2013.01) |
| G06F 21/35 | (2013.01) |
| G06Q 20/04 | (2012.01) |
| G06Q 20/32 | (2012.01) |
| G06Q 30/06 | (2012.01) |
| G07B 15/02 | (2011.01) |
| G07F 17/24 | (2006.01) |
| H04L 29/06 | (2006.01) |
| H04L 9/32 | (2006.01) |

(52) U.S. Cl.
CPC ............ *G06F 21/6209* (2013.01); *G06F 21/35* (2013.01); *G06Q 20/045* (2013.01); *G06Q 20/32* (2013.01); *G06Q 20/3223* (2013.01); *G06Q 30/06* (2013.01); *G07B 15/02* (2013.01); *G07F 17/24* (2013.01); *H04L 9/3263* (2013.01); *H04L 9/3271* (2013.01); *H04L 63/123* (2013.01); *H04L 63/1441* (2013.01); *H04L 63/1466* (2013.01); *G06F 2221/2103* (2013.01); *G06F 2221/2141* (2013.01); *G06F 2221/2153* (2013.01); *H04L 2209/56* (2013.01); *H04L 2209/805* (2013.01); *H04L 2209/84* (2013.01)

(58) Field of Classification Search
CPC ...................................................... G07F 7/1008
USPC ......................................... 235/375, 439, 487
See application file for complete search history.

(56) References Cited

U.S. PATENT DOCUMENTS

| | | | | |
|---|---|---|---|---|
| 5,124,535 | A * | 6/1992 | Kocznar et al. ................ | 235/380 |
| 6,522,770 | B1 * | 2/2003 | Seder et al. .................... | 382/100 |
| 6,690,794 | B1 | 2/2004 | Terao et al. | |
| 2002/0094090 | A1 * | 7/2002 | Iino .............................. | 380/282 |
| 2003/0028765 | A1 * | 2/2003 | Cromer et al. ................ | 713/164 |

FOREIGN PATENT DOCUMENTS

| | | |
|---|---|---|
| EP | 1 069 539 | 1/2001 |
| WO | WO 98/49654 | 11/1998 |
| WO | WO 02/48975 | 6/2002 |
| WO | WO 0248975 A1 * | 6/2002 |

\* cited by examiner

*Primary Examiner* — Rafferty Kelly
(74) *Attorney, Agent, or Firm* — Cozen O'Connor

(57) ABSTRACT

The method serves to verify the validity of an electronic parking ticket stored in an electronic entity. The method includes a step of securely obtaining from the electronic ticket specific data that is specific to said electronic entity or to the vehicle in which it is installed, and a step of making available at least a portion of said specific data on an inspection device. The method enables a dishonest attack of the "man-the-middle" type to be detected.

15 Claims, 4 Drawing Sheets

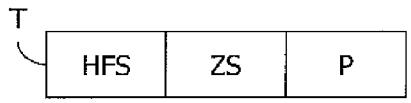
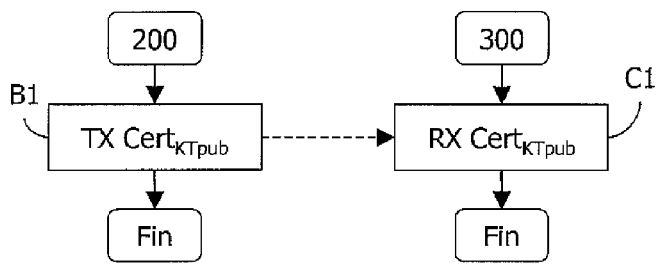
FIG. 1
FIG. 3
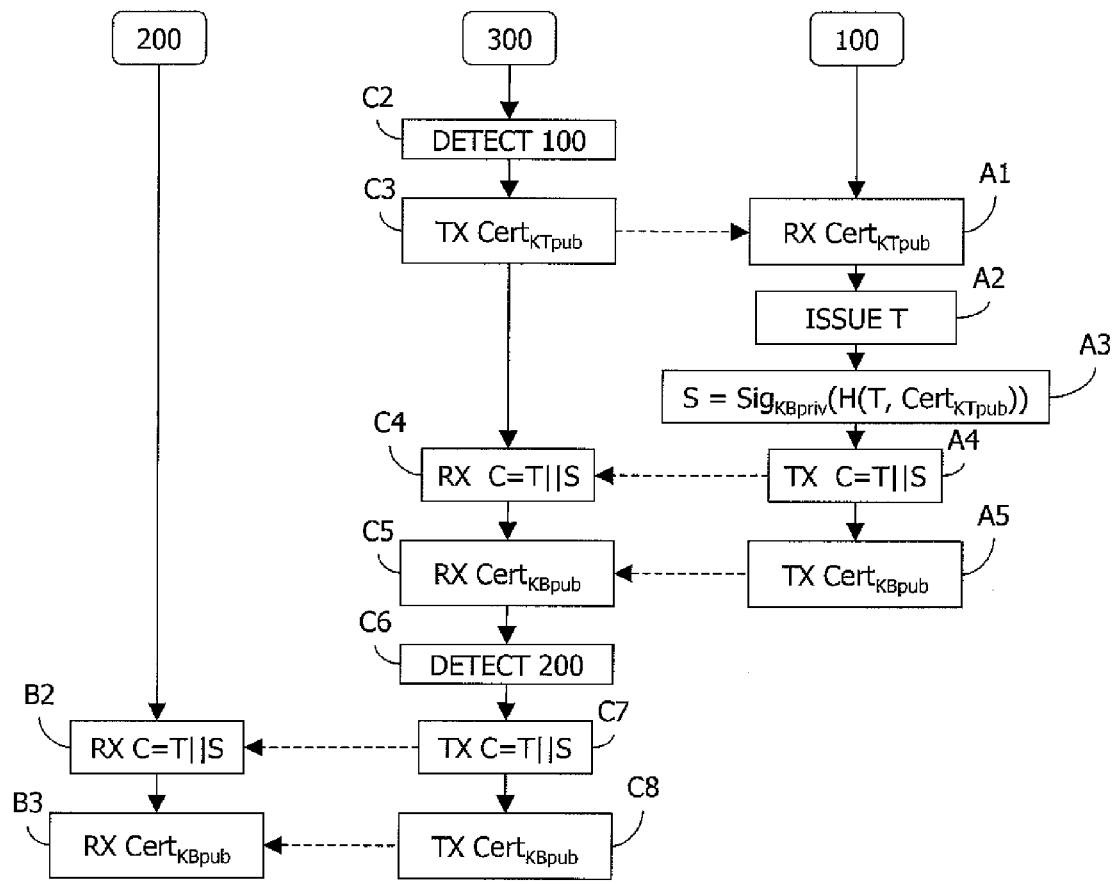
FIG. 4

METHOD OF VERIFYING THE VALIDITY OF AN ELECTRONIC PARKING TICKET

RELATED APPLICATIONS

This application claims the priority of French patent application Ser. No. 09/56433 filed Sep. 18, 2009, the entire content of which is hereby incorporated by reference.

BACKGROUND OF THE INVENTION

The present invention lies in the field of dematerializing parking tickets.

Document WO 2004/055736 describes a system for managing parking places in which parking tickets are constituted by electronic parking tickets issued by a ticket machine in return for payment.

More precisely, those parking tickets are transponders capable of contactless communication with a reader used by an inspector to verify ticket validity.

The Applicant has found that although that system is particularly advantageous, it is not proof against attacks known to the person of the art of cryptography under the term "man-in-the-middle" (MITM) attack.

In the mechanism of document WO 2004/055736, if a pirate transponder manages fraudulently to recover parking data stored in some other transponder, and then manages to give that data to an inspector when interrogated, the inspector is not in a position to detect the fraud since the data presented to the inspector is entirely valid.

OBJECT AND SUMMARY OF THE INVENTION

One object of the invention is to provide a method of verifying the validity of a parking ticket that does not present the drawbacks of prior art tickets.

More particularly, in a first aspect, the invention provides a method of verifying the validity of an electronic parking ticket, said ticket including parking data stored in memory of an electronic entity placed in a vehicle.

This method may be implemented by an inspection device. The method comprises:
  a step of securely obtaining the electronic ticket from the electronic entity;
  a step of making parking data available;
  a step of securely obtaining data that is specific to the vehicle or to the electronic entity, the electronic ticket and that specific data being received from the electronic entity by wireless communication means; and
  a step of making available at least a portion of said specific data.

In general, a step of obtaining data securely is a step that makes it possible to guarantee the origin and the integrity of the data obtained, e.g. by means of a cryptographic signature.

Thus, and in remarkable manner, when verifying an electronic ticket, the inspector obtains not only parking data, but also data specific to the electronic entity being inspected or to the vehicle in which the entity is located.

By verifying this additional data, the inspector can detect a "man-in-the-middle" type attack, as described in greater details below with reference to FIG. 6.

In a particular implementation, the step of obtaining the data specific to the vehicle or to the electronic entity comprises a step of receiving and verifying a digital certificate of the electronic entity, this certificate being obtained using that specific data and a public key of the electronic entity.

In another embodiment, the specific dara may be encrypted or signed with another kind of cryptographic means using a key stored in the electronic entity.

In a preferred implementation of the invention, this inspection consists in comparing the specific data with a visible characteristic of the vehicle or of the electronic entity.

This characteristic may be constituted by a number etched in an element of the vehicle, e.g. its windshield. It may also be the number of the vehicle's number plate. It may also be a serial number printed or etched on the surface of the electronic entity, or more generally a mark on the electronic entity that can be seen by an inspector from outside the vehicle. It may be the marque, the model, or the color of the vehicle, or indeed a combination of at least one of these elements with the vehicle's number-plate number.

In a particular implementation, the verification method of the invention includes a further step of securely obtaining data associating the ticket with the above-mentioned specific data.

In a particular implementation of the invention, the step of making available the specific data (or portion of it) is a step of displaying said specific data on the screen of the inspection device.

In another aspect, the invention also provides an electronic entity suitable for being placed in a vehicle and comprising:
  means for storing an electronic parking ticket in memory, the ticket including parking data for said vehicle;
  means for storing in memory specific data that is specific to said vehicle or to said electronic entity; and
  wireless communication means for securely transmitting said electronic ticket and said specific data to an inspection device.

In another aspect, the invention also provides an inspection device suitable for use in verifying the validity of an electronic parking ticket stored in a memory of an electronic entity placed in a vehicle and comprising:
  wireless communication means for securely obtaining from said electronic entity said ticket and data specific to said vehicle or to said electronic entity; and
  means for making available at least some of the parking data included in said ticket and at least a portion of said specific data.

BRIEF DESCRIPTION OF THE DRAWINGS

Other characteristics and advantages of the present invention appear from the following description made with reference to the accompanying drawings that show an implementation having no limiting character. In the figures:

FIG. 1 represents an electronic ticket T suitable for use in the invention;

FIG. 3 is a flow chart showing a coupling mechanism that may be used in the context of the invention;

FIG. 4 is a flow chart showing a secure mechanism for purchasing an electronic ticket and for storing said ticket in a memory of an electronic entity in accordance with the invention;

DETAILED DESCRIPTION OF THE DRAWINGS

There follows a description of how the invention enables the validity of an electronic parking ticket T to be verified.

FIG. 1 represents an example of a ticket T suitable for use in the invention.

In this example, the electronic ticket T includes parking data, namely:
an end-of-parking time HFS;
a parking zone ZS; and
a price paid P.

Figure 2A:
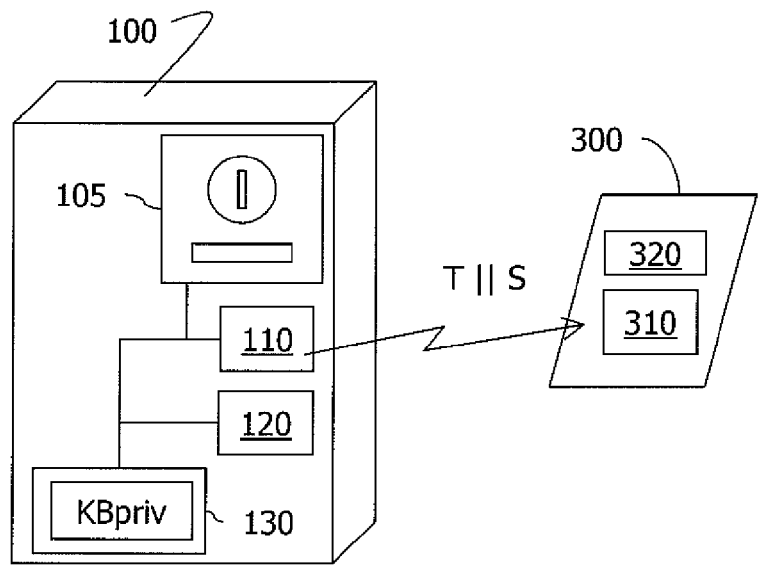
FIGS. 2A to 2C show the principle of a procedure for purchasing an electronic ticket and storing said ticket in a memory in an electronic entity.
Figure 2B:
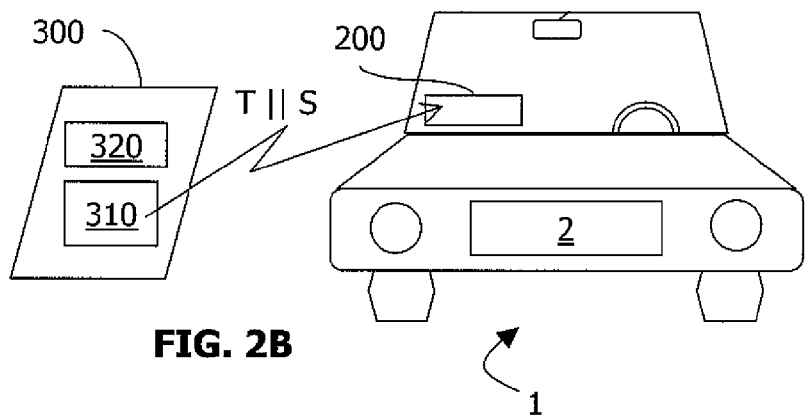
Figure 2C:
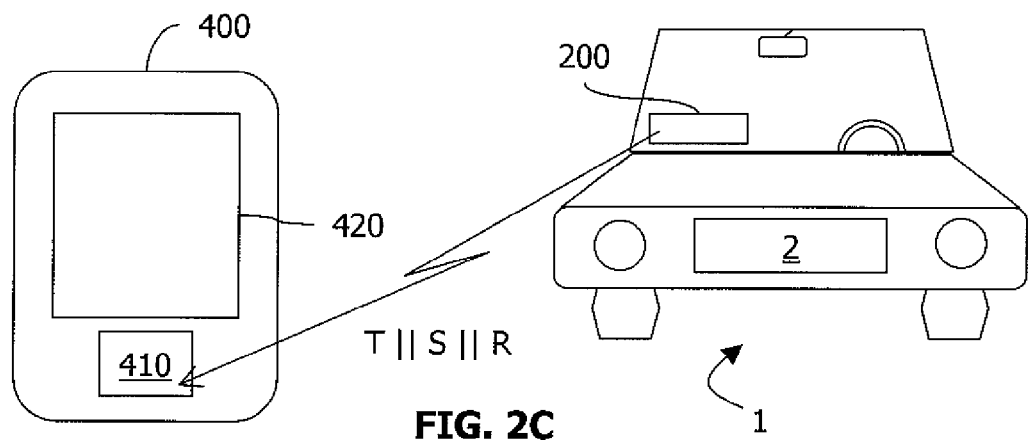

In the embodiment described here, and as shown in FIGS. 2A to 2C, the electronic ticket T is issued by a ticket machine 100.

The ticket machine 100 includes payment means 105 enabling a user to insert cash or a credit card in order to pay the price P.

In the example described here, the electronic ticket T is issued by the ticket machine 100 via wireless communication means 110 and it is received by corresponding wireless communication means 310 of a mobile telephone 300 of the user.

By way of example, the wireless communication means 110, 310 comply with the Bluetooth standard, the WiFi standard, or the near field communication (NFC) standard.

When the user brings the mobile telephone 300 close to the vehicle 1, the electronic ticket T is transferred from the memory of the mobile telephone 300 to a unit (or transponder) 200 including wireless communication means 210 corresponding to the wireless communication means 310 of the mobile telephone 300.

The electronic ticket T may be verified subsequently by an inspector (a human being) provided with an inspection device 400, e.g. a personal digital assistant (PDA) including wireless communication means 410 suitable for downloading the electronic ticket T from the transponder 200.

There follows a description of how these mechanisms for issuing and verifying an electronic ticket are made secure.

In the embodiment described here, the transponder 200 has a certified public key $Cert_{KTpub}$, this digital certificate serving to associate the public key KTpub of the transponder 200 with an identifier ID specific to the transponder or the vehicle 1 in which the transponder is installed.

More precisely, in the embodiment described here, the certificate $Cert_{KTpub}$ is obtained using the following formula:

$$Cert_{KTpub} = ID\|KTpub\|Sig_{KApriv}(H(ID,KTpub))$$

in which:
H is a hashing function; and
$Sig_{KApriv}$ is a signature function with the private key of a certification body.

In the example described here, the certificate $Cert_{KTpub}$ of the transponder 200 is imported by coupling in the memory of the mobile telephone 300.

This mechanism is described by means of a flow chart in FIG. 3 in which step B1 is a step of the transponder 200 sending the certificate, and the step C1 is a step of the mobile telephone 300 receiving the certificate, the transponder 200 and the mobile telephone 300 communicating for this exchange via their wireless communication means 210, 310.

The way this mechanism is made secure does not form part of the field of the invention. In an implementation of the invention, communication between the transponder 200 and the mobile telephone 300 may be made secure by cryptographic means known to the person skilled in the art.

In a preferred implementation of the invention, the certificate $Cert_{KTpub}$ is stored in a subscriber identity module (SIM) card of the mobile telephone 300. Knowledge of the certificate $Cert_{KTpub}$ of the transponder 200 enables the mobile telephone to:
verify the identity of the transponder by a challenge/response procedure using the key KTpub incorporated in the certificate $Cert_{KTpub}$; and
present the certificate to a ticket machine so that it can associate an electronic ticket with the certificate, e.g. by a signing and hashing operation before sending the ticket to the transponder.

Once this coupling has been performed, the user can address the ticket machine 100 directly in order to purchase an electronic ticket T without being obliged to interact with the transponder 200 prior to each transaction.

With reference to FIG. 4, there follows a description of how a user purchases an electronic ticket T.

It is assumed that the user of a parked vehicle 1 brings a mobile telephone 300 up to a ticket machine 100.

During a step C2, the wireless communication means 310 of the mobile telephone 300 detect the presence of wireless communication means 110 of the ticket machine 100 once they are within range.

Thereafter, the mobile telephone 300 acts during a step C3 to send the certificate $Cert_{KTpub}$ of the transponder 200 to the ticket machine 100, which certificate is stored in the memory of the mobile telephone 300 by coupling as described above with reference to FIG. 3.

The certificate $Cert_{KTpub}$ is received by the ticket machine 100 during a step A1.

It is subsequently assumed that the user inserts cash into the slot machine 105 of the ticket machine 100 in order to purchase an electronic ticket T, the electronic ticket T being issued by the ticket machine 100 during a step A2.

In the implementation described here, the ticket machine 100 includes cryptographic means 120, e.g. encryption means, for calculating the signature S of the electronic ticket T while incorporating therein the digital certificate $Cert_{KTpub}$ presented by the mobile telephone 300 during a step A3. By way of example, the signature S may be calculated using the following formula:

$$S = Sig_{KBpriv}(H(T,Cert_{KTpub}))$$

in which $Sig_{KBpriv}$ is a signature function with the private key KBpriv of the ticket machine 100.

Thereafter, during a step A4, the ticket machine 100 uses its wireless communication means 110 to transmit data C comprising the electronic ticket T and the signature S, this data C being received by the wireless communication means 310 of the mobile telephone 300 during a step C4.

In the implementation described here, the ticket machine also acts during a step A5 to send its certificate $Cert_{KTpub}$, which certificate is received by the mobile telephone 300 during a step C5.

There is no need for the ticket machine 100 to send the certificate $Cert_{KTpub}$ to the mobile telephone 300 if said certificate is known to the inspection devices 400 used for verifying the validity of the electronic ticket T issued by the ticket machine.

At the end of steps C2 to C5, the electronic ticket T and its signature S are stored in the mobile telephone 300.

It is assumed that the user brings the mobile telephone 300 close to the transponder 200 installed in the vehicle 1 and that the wireless communication means 310 of the mobile telephone 300 detect the wireless communication 210 of the transponder 200 during a step C6.

During a step C7, the mobile telephone 300 sends the data C including the electronic ticket T and its signature S to the transponder 200, this data C being received by the transponder 200 during a step B2.

If the mobile telephone 300 has received the certificate $Cert_{KTpub}$ from the ticket machine 100 in a step C5, then it also transmits it to the transponder 200 during a step C8, with this certification being received by the transponder during a step B3.

In this implementation, the mobile telephone 300 constitutes a kind of communications channel between the transponder 200 and the ticket machine 100.

In this implementation, the data C may be duplicated. Nevertheless, during an inspection, only the transponder having the private key KTpriv associated with the certificate $Cert_{KTpub}$ will be in a position to prove that the electronic ticket belongs thereto by means of a challenge/response procedure.

Figure 5:
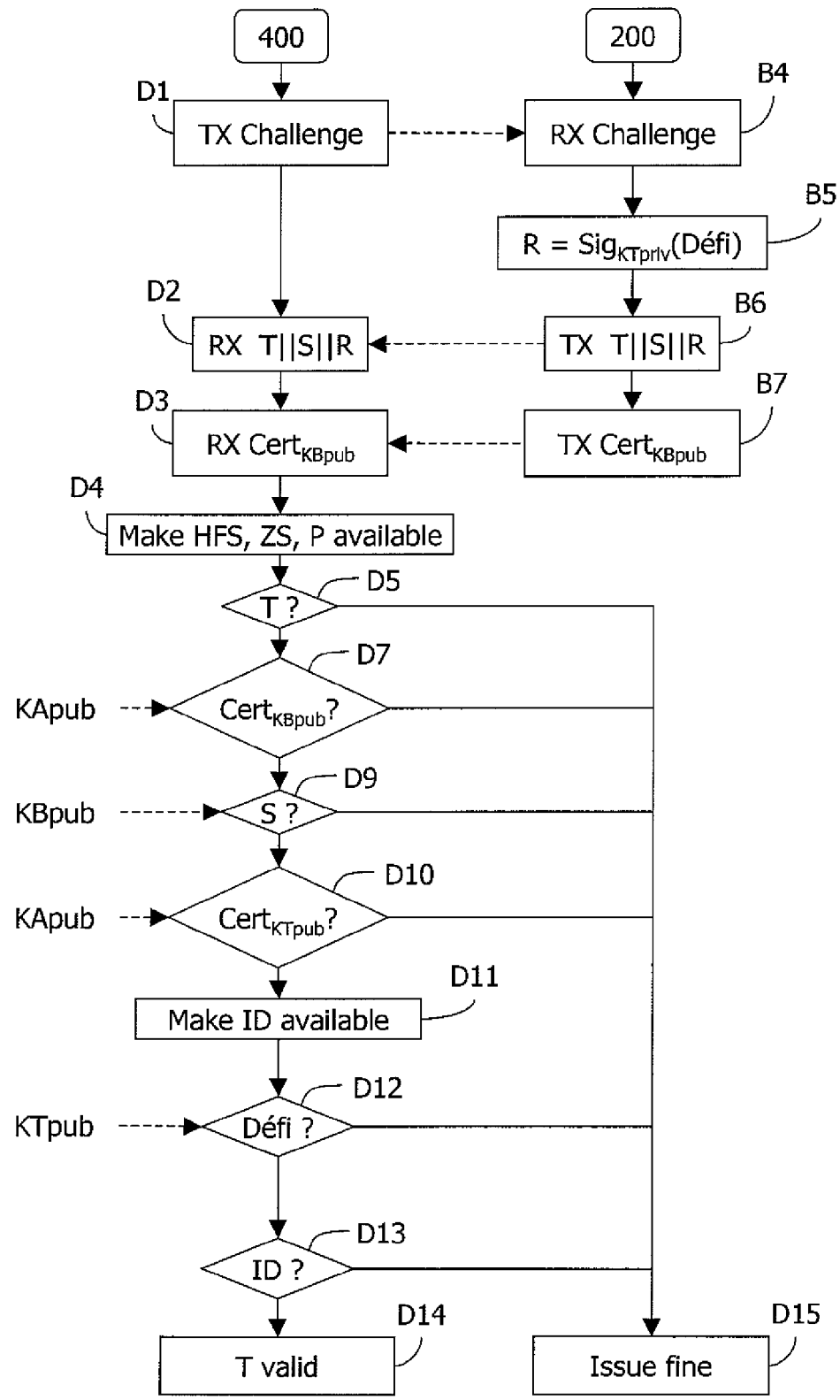
FIG. 5 is a flow chart showing a method of verifying the validity of an electronic ticket in accordance with the invention.

With reference to FIG. 5, there follows a description of a method of verifying the validity of the electronic ticket T in accordance with the invention.

It is assumed that this verification is performed by an inspector (a human being) carrying an inspection device 400 including wireless communication means 410 compatible with the wireless communication means 210 of the transponder 200.

In the implementation described here, the wireless communication means 410 of the inspection device 400 and the wireless communication means 210 of the transponder 200 comply with the NFC standard; these may be secure wireless communication means.

These wireless communication means are preferably very short range communication means, for example with a range of less than 60 cm, for example less than 30 cm, for example about 10 to 15 cm.

Such a very short range brings several advantages, notably:
  reducing power consumption in the inspection device 400 and in the transponder 200;
  enhancing security, very short range communication requiring the inspector to approach his inspection device very close to the transponder 200, which makes a man in the middle attack impossible.

Note that a solution using longer range communication means (for example ten meters or more), like Bluetooth or Wifi, is more complex than the solution of the invention since it requires supplementary means to distinguish several transponders, such as a specific protocol or specific identifiers.

In the implementation described here, the inspection device 400 is constituted by a PDA.

It is assumed that the inspector brings the PDA 400 close enough to the transponder 200 for communication to be established between the wireless communication means 410 of the PDA 400 and the wireless communication means of the transponder 200.

In the implementation described here, during a step D1, the PDA 400 sends a challenge to the transponder 200, which transponder receives the challenge during a step B4.

During a step B5, the transponder 200 calculates a signature R for the challenge using its private key KTpriv.

Then, during a step B6, the transponder 200 sends to the inspection device 400 the electronic ticket T, the signature S of said ticket, and the signature R of the challenge, the data T, S, and R being received by the inspection device 400 during a step D2.

If the transponder 200 has received the certificate $Cert_{KTpub}$ of the ticket machine 100 (see step B3), then the transponder 200 sends the certificate to the PDA 400 during a step B7, with the PDA receiving the certificate during a step D3.

During a step D4, the PDA displays the parking data HFS, ZS, and P contained in the electronic ticket T on its screen 420.

During a test D5, the inspector verifies whether the parking of the vehicle 1 is or is not authorized on the basis of this data.

If not authorized, then the result of the test D5 is negative and the test is followed by a step D15 during which the inspector may issue a fine to the owner of the vehicle 1.

If the result of the test D5 is positive, then in the implementation described here, the PDA 400 acts during a test D7 to verify the validity of the certificate $Cert_{KTpub}$ of the ticket machine 100 using the public key KApub associated with the private key KApriv of the trusted authority that issued the certificate.

If verification of the certificate fails, then the result of the test D7 is negative and the test is followed by above-described step D15 during which the inspector issues a fine to the owner of the vehicle 1.

If the certificate $Cert_{KTpub}$ of the ticket machine 100 is validated, then the result of the test D7 is positive. The test is followed by a test D9 during which the PDA 400 verifies the validity of the signature S of the electronic ticket T by using the public key KBpub of the ticket machine 100.

If this test fails, the result of the test D9 is negative and the test is followed by above-described step D15

Otherwise, if the signature S is validated, the result of the test D9 is positive.

During this step, the FDA 400 recovers the certificate $Cert_{KTpub}$ of the transponder 200 before verifying the integrity of the electronic ticket T.

The test D9 is followed by a test D10 during which the PDA 400 verifies the validity of the certificate $Cert_{KTpub}$ using the public key KApub of the trusted authority.

If the result of the test D10 is negative, it is followed by above-described step D15.

Otherwise, if the certificate $Cert_{KTpub}$ is validated, the result of test D10 is positive. This test D10 enables the PDA 400 to recover the public key KTpub of the transponder 200 and the identifier ID specific to the transponder 200 or to the vehicle 1 in which it is installed.

In the implementation described here, the identifier ID is displayed on the screen 420 of the PDA 400 during a step D11. In a variant, only a portion of the identifier ID is displayed by the PDA 400.

In another implementation, the display step D11 takes place before the test D9.

In the embodiment described here, the display step D11 is followed by a test D12 of verifying the challenge, using the public key KTpub.

The inspector then acts in a step D13 to verify the validity of the identifier ID by comparing it with a visible mark that can be seen on the transponder 200 or on the vehicle 1.

For example, the identifier may be etched on the windshield of the vehicle or on the transponder 200. The identifier may also be displayed by the number plate of the vehicle 1.

In any event, it is important for the visible mark to be tamperproof, or at least difficult to falsify.

This verification consisting in comparing the identifier ID received from the transponder with the visible mark that can be seen on the vehicle 1 or the transponder 200 makes it possible to detect a dishonest attack known to the person skilled in the art as a "man-in-the-middle" type of attack.

Figure 6:
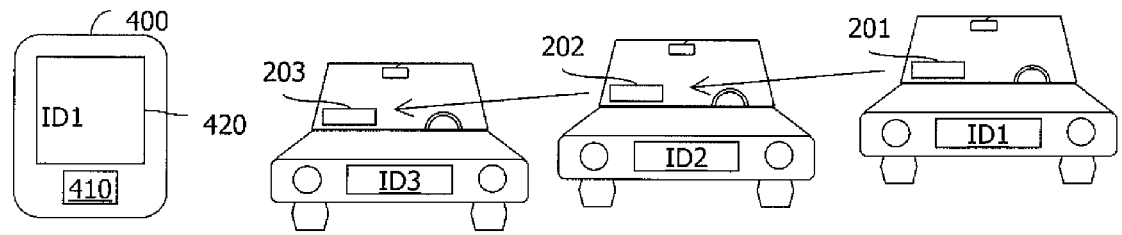
FIG. 6 shows how a dishonest attack of the "man-in-the-middle" type is detected by the invention.

More precisely, in the context of the invention, a "man-in-the-middle" attack would be an attack in which a transponder 203 interrogated by the inspection device 400 supplies it not with a parking ticket that has been acquired appropriately by the user and owner of the transponder 203, but with valid data that has been obtained fraudulently by the transponder 203 progressively (or step by step) from another transponder 201 as shown in FIG. 6.

The person skilled in the art will understand that under such circumstances, the identifier displayed on the screen 420 of the PDA 400 will be data ID1 specific to said other transponder 201 or the vehicle 1 in which the other transponder 201 is installed, and this is very easily detected by the inspector.

It is important to observe that in this implementation, the signature S obtained in step A3 enables the electronic ticket T to be associated with the specific data ID. This makes it possible to avoid a fraud in which a pirate transponder 200 obtains the electronic ticket T and the ID data progressively from two different transponders.

Figure 7:
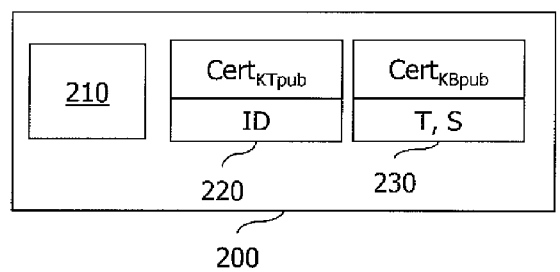
FIG. 7 is a diagram representing an electronic entity in accordance with the invention.

FIG. 7 is a diagram representing an electronic entity 200 (or transponder) in accordance with the invention.

This electronic entity has wireless communication means 210 suitable for communicating with equivalent means of a mobile telephone and of an inspection device 400, e.g. wireless communication means complying with the Bluetooth standard or near field communication means.

In accordance with the invention, the electronic entity 200 stores an identifier ID specific to said electronic entity or to the vehicle in which it is installed.

In the implementation described here, this specific data ID is stored in a read-only memory (ROM) 220, which memory also includes the certificate $Cert_{KTpub}$ of the entity.

In the implementation described here, the electronic entity 200 also includes a flash type memory 230 for storing at least one electronic ticket T, the signature S given to the ticket by the ticket machine 100 and possibly also the certificate $Cert_{KTpub}$ of the ticket machine. This data is received by the electronic entity 200 as described above with reference to steps B2 and B3 of FIG. 4.

Figure 8:
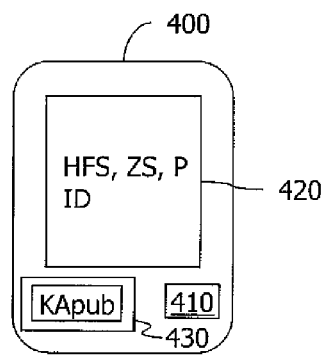
FIG. 8 is a diagram representing an inspection device in accordance with the invention.

FIG. 8 shows an inspection device 400 in accordance with the invention, which device may be used by an inspector for verifying the validity of a parking ticket T stored in the transponder 200 as described above with reference to FIG. 7.

The inspection device 400 includes in particular wireless communication means 410 compatible with those of the transponder 200 and means for displaying firstly the parking data included in an electronic ticket T, and secondly the identifier specific to the transponder 200 or to the vehicle 1 in which it is installed.

These display means 420 may be constituted by a screen, for example.

In the implementation described here, the inspection device 400 also includes a flash memory 430 in which it stores the public key KApub of the trusted authority.

Description of a Second Implementation

In a second implementation of the invention, the transponder does not have a certified public key but only its own identifier ID (specific to the transponder or to the vehicle in which the transponder is installed), this identifier ID being transmitted to the mobile telephone during coupling (steps B1 and C1 of FIG. 3).

In this second implementation, the signature S given to the electronic ticket T by the transponder is calculated (step A3) using the formula:

$$S = Sig_{KBpriv}(H(T,ID))$$

The identifier ID specific to the transponder or to the vehicle is obtained in this second implementation during the test D9 of verifying the validity of the signature S and it is displayed on the inspection device 400 of the inspector.

As in the first embodiment, the signature S constitutes data associating the electronic ticket T and its specific identifier ID.

Other Implementations

In both of the implementations described above, the electronic ticket T and its signature are supplied to the transponder 200 via the mobile telephone 300 of the user. The invention extends to any other way of the transponder obtaining the electronic ticket T and its signature S.

In the two above-described implementations, data is used that associates the electronic ticket T and the specific data ID, the association data being constituted by the signature S calculated in step A3 using the following formula:

$$S = Sig_{KBpriv}(H(T, Cert_{KTpub}))$$

or $$S = Sig_{KBpriv}(H(T,ID))$$

In a variant, and by way of example, it is possible in step A3 to associate the ticket T and the specific data ID by calculating two data signatures S1 and S2 as follows:

$$S1 = Sig_{KBpriv}(H(T,VA))$$

and $$S2 = Sig_{KBpriv}(H(T,VA))$$

each of these signatures using the same value VA, e.g. a value that is selected randomly.

What is claimed is:

1. A method of verifying the validity of an electronic parking ticket issued by a ticket machine, said ticket including parking data stored in memory of an electronic entity placed in a vehicle, the method comprising:
   wirelessly and securely obtaining said electronic ticket from said electronic entity;
   making available at least some of the parking data;
   wirelessly and securely obtaining from said electronic entity a digital certificate of the electronic entity and a cryptographic signature of said electronic ticket,
   wherein said digital certificate is based on specific data specific to said vehicle and a public key of said electronic entity, and only said electronic entity has a private key associated with said digital certificate, and
   wherein said cryptographic signature is calculated by said ticket machine while incorporating therein said electronic ticket and said digital certificate;
   making available at least a portion of said specific data; and
   verifying said digital certificate to authenticate said electronic entity.

2. The verification method according to claim 1, further comprising comparing said at least a portion of the specific data with a characteristic of said vehicle.

3. The verification method according to claim 2, wherein said characteristic comprises a visible mark that can be seen on the outside of said vehicle.

4. The verification method according to claim 3, wherein said characteristic comprises a number etched on an element of said vehicle.

5. The verification method according to claim 1, wherein making available said at least a portion of said specific data comprises displaying said specific data on a screen of said inspection device.

6. The verification method according to claim 1, wherein said cryptographic signature S is cryptographically calculated by one of the following formulas:

$$S = Sig_{KBpriv}(H(T, CERT_{KTpub})); \text{ or}$$

$$S = Sig_{KBpriv}(H(T, ID)), \text{ in which:}$$

$Sig_{KBpriv}$ is a signature function with the private key $KP_{priv}$ of said ticket machine; and H is a hashing function.

7. An electronic entity for being placed in a vehicle, said entity comprising:

first memory to store specific data that is specific to said vehicle;

second memory to store an electronic parking ticket issued by a ticket machine, the ticket including parking data for said vehicle and a cryptographic signature of said electronic ticket, said cryptographic signature being calculated by the ticket machine while incorporating therein said electronic ticket and a digital certificate associating a public key of said electronic entity with said specific data, wherein only said electronic entity has a private key associated with said digital certificate; and wireless communication means for securely transmitting said electronic ticket, said specific data and said signature to an inspection device.

8. The electronic entity according to claim 7, wherein the electronic entity comprises a transponder.

9. An inspection device for verifying the validity of an electronic parking ticket issued by a ticket machine stored in a memory of an electronic entity placed in a vehicle, the inspection device comprising:

wireless communication means for securely obtaining from said electronic entity said ticket, data specific to said vehicle and a cryptographic signature of said electronic parking ticket, said cryptographic signature being calculated by said ticket machine while incorporating therein said electronic ticket and a digital certificate associating a public key of said electronic entity with said specific data, wherein only said electronic entity has a private key associated with said digital certificate; and means for making available at least some of the parking data included in said ticket and at least a portion of said specific data.

10. The inspection device according to claim 9, wherein said wireless communication means comply with the NFC standard.

11. The inspection device according to claim 9, wherein said wireless communication means comprise very short range communication means having a range of less than 60 cm.

12. The inspection device according to claim 11, wherein said wireless communication means has a range of less than 30 cm.

13. The inspection device according to claim 12, wherein said wireless communication means has a range of from about 10 cm to about 15 cm.

14. The inspection device according to claim 9, wherein said means for making available comprises a display screen.

15. The inspection device according to claim 9, further comprising memory to store the public key.

* * * * *